(12) United States Patent
Bartoli et al.

(10) Patent No.: US 8,663,080 B2
(45) Date of Patent: Mar. 4, 2014

(54) APPARATUS FOR FORMING ASEPTIC CONTAINERS

(75) Inventors: Andrea Bartoli, Reggio Emilia (IT); Flavio Traldi, San Prospero (IT)

(73) Assignee: Sarong Societa' per Azioni (IT)

( * ) Notice: Subject to any disclaimer, the term of this patent is extended or adjusted under 35 U.S.C. 154(b) by 338 days.

(21) Appl. No.: 12/933,551

(22) PCT Filed: Mar. 23, 2009

(86) PCT No.: PCT/IB2009/000569
§ 371 (c)(1),
(2), (4) Date: Dec. 3, 2010

(87) PCT Pub. No.: WO2009/118597
PCT Pub. Date: Oct. 1, 2009

(65) Prior Publication Data
US 2011/0071009 A1  Mar. 24, 2011

(30) Foreign Application Priority Data
Mar. 25, 2008  (IT) .............................. MO2008A0085

(51) Int. Cl.
*B31B 9/00* (2006.01)

(52) U.S. Cl.
USPC ................. 493/52; 53/563; 53/511; 53/111 R

(58) Field of Classification Search
USPC .................... 493/52; 53/511, 127, 111 R, 563
See application file for complete search history.

(56) References Cited

U.S. PATENT DOCUMENTS

| | | | | |
|---|---|---|---|---|
| 3,744,209 A | * | 7/1973 | Conley et al. | 53/426 |
| 3,808,772 A | * | 5/1974 | Turtschan | 53/141 |
| 3,820,300 A | * | 6/1974 | Reinecke | 53/425 |
| 3,899,862 A | * | 8/1975 | Muys et al. | 53/426 |
| 3,911,640 A | * | 10/1975 | Rausing | 53/426 |
| 3,942,299 A | * | 3/1976 | Bory | 53/425 |
| 4,048,781 A | * | 9/1977 | Johansen | 53/453 |
| 4,120,984 A | * | 10/1978 | Richardson et al. | 426/412 |
| 4,166,412 A | * | 9/1979 | Versteege | 493/193 |
| 4,287,702 A | * | 9/1981 | Corbic | 53/425 |
| 4,329,829 A | * | 5/1982 | Torterotot | 53/426 |
| 4,349,508 A | * | 9/1982 | Liede | 422/1 |
| 4,417,607 A | * | 11/1983 | Scholle et al. | 141/1 |
| 4,512,133 A | * | 4/1985 | Torterotot | 53/167 |
| 4,543,770 A | * | 10/1985 | Walter et al. | 53/511 |
| 4,603,541 A | * | 8/1986 | Medwed | 53/561 |
| 4,788,811 A | * | 12/1988 | Kawajiri et al. | 53/426 |

(Continued)

FOREIGN PATENT DOCUMENTS

| | | |
|---|---|---|
| CH | 527731 A | 9/1972 |
| DE | 2440372 A1 | 3/1976 |
| EP | 0727357 A1 | 1/1996 |
| GB | 1513266 A | 6/1978 |

*Primary Examiner* — Hemant M Desai
*Assistant Examiner* — Gloria R Weeks
(74) *Attorney, Agent, or Firm* — Laubscher & Laubscher, P.C.

(57) ABSTRACT

An apparatus for obtaining containers from a sheet material includes an operating unit for processing the sheet material. The operating unit includes an upper operating part for interacting with an upper surface of the sheet material and a lower operating part for interacting with a lower surface of the sheet material. The apparatus further includes a sterilizing arrangement for sterilizing a space adjacent to the upper operating part and to the lower operating part, so as to create a substantially aseptic environment above and below the sheet material.

34 Claims, 7 Drawing Sheets

(56) References Cited

U.S. PATENT DOCUMENTS

| | | | |
|---|---|---|---|
| 4,794,750 A * | 1/1989 | Schmidt et al. | 53/410 |
| 4,996,824 A * | 3/1991 | Torterotot | 53/426 |
| 5,077,954 A * | 1/1992 | Williams | 53/89 |
| 5,103,618 A * | 4/1992 | Garwood | 53/433 |
| 5,426,919 A * | 6/1995 | Natterer et al. | 53/559 |
| 5,555,702 A * | 9/1996 | Sizer | 53/127 |
| 5,685,130 A * | 11/1997 | Horsman | 53/510 |
| 5,749,203 A * | 5/1998 | McGowan, Jr. | 53/432 |
| 5,941,054 A * | 8/1999 | Valyi | 53/453 |
| 6,024,683 A * | 2/2000 | Wilkes | 493/196 |
| 6,616,586 B2 * | 9/2003 | Dai | 493/158 |
| 6,622,457 B2 * | 9/2003 | Kurth | 53/425 |
| 6,701,695 B1 * | 3/2004 | Douglas | 53/511 |
| 7,963,089 B2 * | 6/2011 | Nelson et al. | 53/453 |
| 2001/0010145 A1 * | 8/2001 | Tawa et al. | 53/425 |
| 2002/0134051 A1 * | 9/2002 | Kurth | 53/425 |
| 2005/0255980 A1 * | 11/2005 | Ventura et al. | 493/197 |
| 2009/0173049 A1 * | 7/2009 | Ruzic et al. | 53/542 |
| 2011/0072759 A1 * | 3/2011 | Mielnik et al. | 53/167 |
| 2012/0264580 A1 * | 10/2012 | Engelhardt | 493/52 |

* cited by examiner

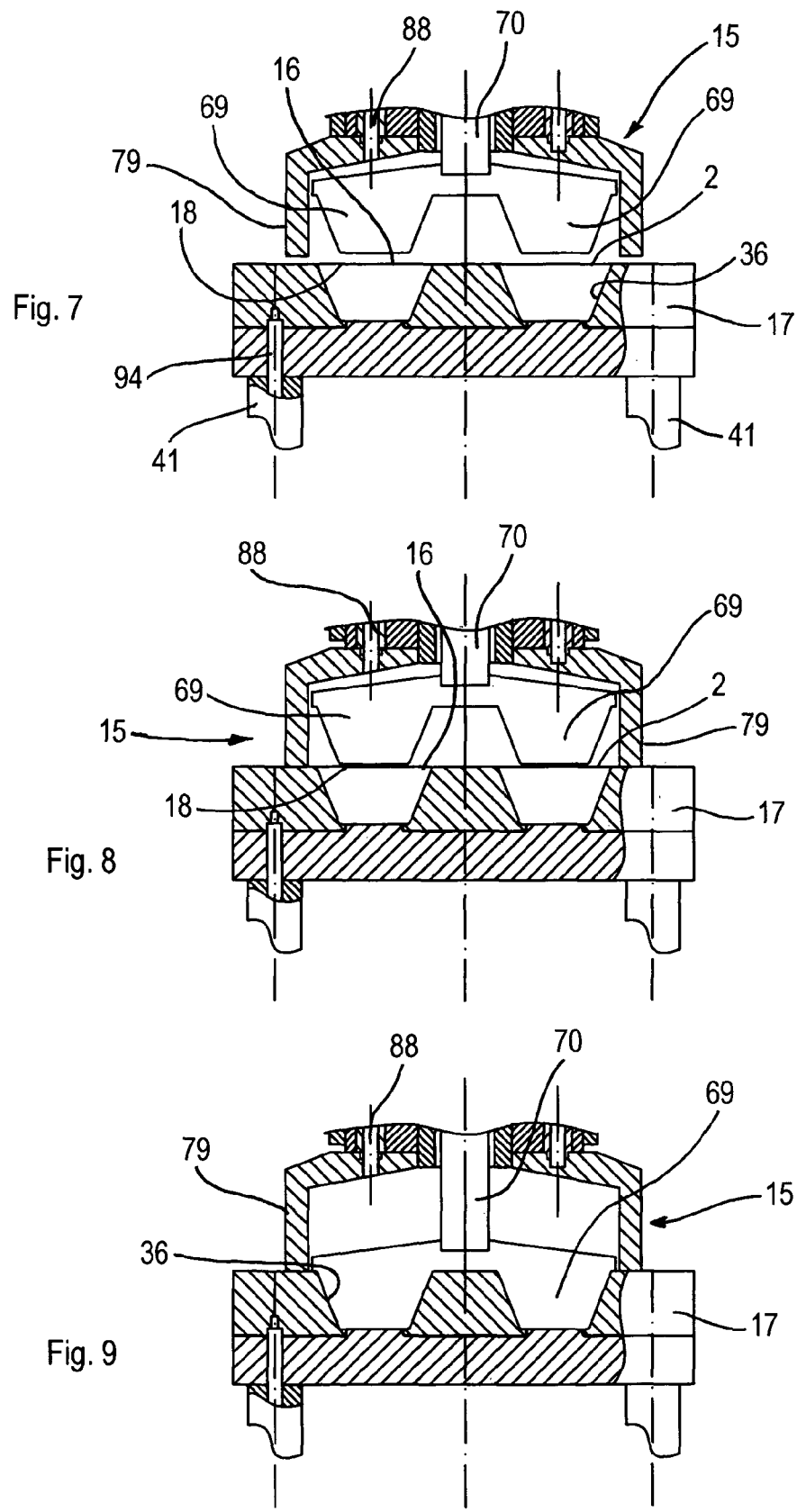

APPARATUS FOR FORMING ASEPTIC CONTAINERS

This application is a 371 of PCT International Application No. PCT/IB2009/000569 filed Mar. 23, 2009. PCT/IB2009/000569 claims priority to IT Application No. MO2008A000085 filed Mar. 25, 2008. The entire contents of this application are incorporated herein by reference.

The invention relates to an apparatus for forming aseptic containers from a sheet material.

Production lines are known for obtaining aseptic containers, comprising a forming unit in which a plurality of containing cavities are obtained on a sheet material. Downstream of the forming unit a filling unit is arranged for filling the containing cavities with a desired product. A closing unit, arranged downstream of the filling unit, welds a closing film to the containing cavities.

The sheet material is advanced through the production line by an advancing system including a pair of chains supporting gripping elements that engage with an edge of the sheet material. The chains are positioned on both sides of the sheet material, such as to grasp two opposite edges of the sheet material. The chains and the gripping elements sealingly engage with the sheet material, so as to prevent the passage of contaminating substances, germs and bacteria from one side to another of the sheet material. In this manner the sheet material acts as a barrier between a space above the sheet material and a space below the sheet material. The space above the sheet material, in which the product to be packaged is processed, is maintained in a sterile condition, so as to prevent contamination of the product. On the other hand, the space below the sheet material is not sterilised and can be contaminated, not only by possible substances in the external environment, but also by particles of oil and grease coming from the underlying operating system of the production line.

A drawback of known production lines is that these lines have a very complicated structure and require long and laborious design and mounting operations. In particular, the advancing system for advancing the sheet material has to be specifically designed so as to ensure that the space below the sheet material is completely insulated from the space above the sheet material.

This makes known production lines not very flexible for producing aseptic containers.

An object of the invention is to improve production lines for producing aseptic containers.

A further object is to simplify the structure and improve the flexibility of the production lines for producing aseptic containers.

According to the invention, there is provided an apparatus for obtaining containers from a sheet material, comprising an operating unit for processing said sheet material, said operating unit comprising an upper operating part for interacting with an upper face of said sheet material and a lower operating part for interacting with a lower face of said sheet material, wherein said apparatus comprises a sterilising arrangement for sterilising a space adjacent to said upper operating part and to said lower operating part, so as to create a substantially aseptic environment above and below said sheet material.

Owing to the invention, it is possible to simplify the structure of the apparatuses for producing aseptic containers. By creating a substantially aseptic environment above and below the sheet material, the need is eliminated for insulating the space above the sheet material from the space below. This makes it possible to use advancing systems that do not sealingly engage with the edges of the sheet material, for example advancing grippers of traditional type.

Further, the sterilising arrangement enables each single operating unit to be enclosed, for example the forming unit, the filling unit or the closing unit, in a substantially aseptic environment. This enables the single operating units to be arranged according to the desired layout, so as to obtain a production line having great flexibility.

The invention can be better understood and implemented with reference to the attached drawings, that illustrate some embodiments thereof by way of non-limiting example, in which:

FIG. 7 is a schematic section of the lower half mould and of the upper half mould of the forming station in FIG. 2, in a first operating configuration;

FIG. 8 is a section like that in FIG. 7, showing the lower half mould and the upper half mould in a second operating configuration;

FIG. 9 is a section like that in FIG. 7, showing the lower half mould and the upper half mould in a third operating configuration;

Figure 1:
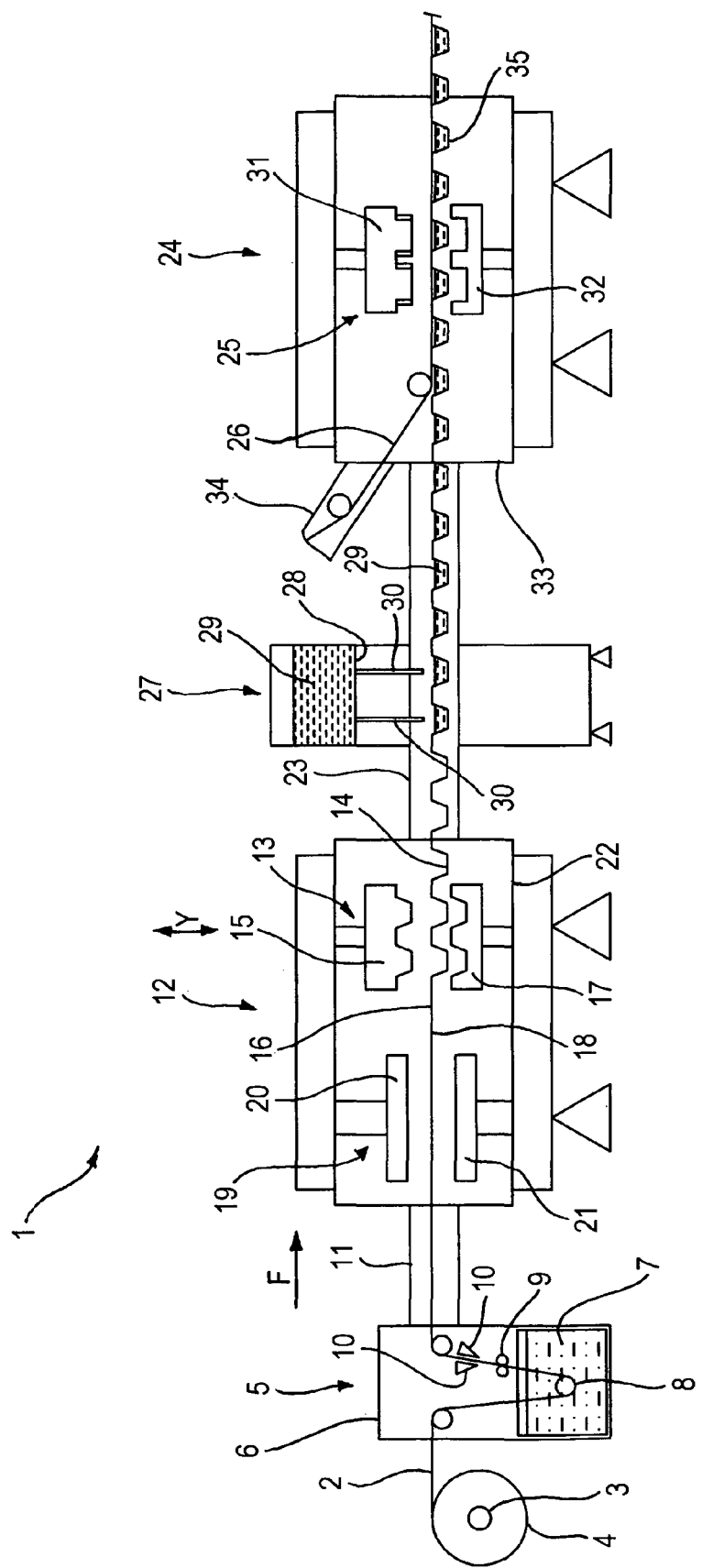
FIG. 1 is a schematic side view of an apparatus for producing aseptic containers.

FIG. 1 shows an apparatus 1 for producing aseptic containers from a sheet material 2. The containers produced by the apparatus 1 are particularly suitable for containing easily perishable food products, sanitary or pharmaceutical products.

The sheet material 2 may be a film of thermoformable polymer material, in which case the containers are obtained by thermoforming, or a metal material, for example aluminium, in which case the containers are obtained by cold deformation.

The apparatus 1 comprises a reel holder 3 for supporting a reel 4 of sheet material 2. The latter is unwound from the reel 4 and advanced in an indexed manner in an advancing direction F by means of advancing elements that are not shown, that may comprise, for example, one or more pairs of grippers that are suitable for grasping opposite edges of the sheet material 2.

The apparatus 1 comprises a sterilising unit 5 arranged for sterilising the sheet material 2 before the latter is deformed. The sterilising unit 5 comprises a chamber 6 inside which a tank 7 is positioned. The tank 7 is filled with a sterilising liquid, for example hydrogen peroxide. A guide roller 8, on which the sheet material 2 is wound, is arranged below the level of the sterilising liquid in the tank 7, in order to immerse the sheet material 2 in the sterilising liquid.

Above the tank 7 there is positioned a pair of distributing rollers 9 interacting with two opposite faces of the sheet material 2, so as to distribute uniformly on such faces the sterilising liquid, which remains adhering to the sheet material 2 leaving the tank 7.

The sterilising unit 5 further comprises a pair of nozzles 10, positioned at a greater height than the distributing rollers 9 such as to interact with respective opposite faces of the sheet material 2. The nozzles 10 are used to dispense jets of hot and clean air onto the sheet material 2, in order to dry possible residues of sterilising liquid located on the sheet material 2. After being dried by the jets of hot air leaving the nozzles 10, the sheet material 2 can be considered sterile.

The chamber 6 is sealingly closed, so as to prevent possible contaminating agents in the external environment coming into contact with the sheet material 2 after the latter has been sterilised.

At the outlet from the chamber 6 there is provided a closed channel 11, which forms a sort of tunnel that extends along the advancing direction F. The closed channel 11 is insulated from the external environment to prevent contamination of the sheet material 2 when the latter, after being sterilised in the sterilising unit 5, advances inside the closed channel 11 to successive operating units. The closed channel 11 connects the sterilising unit 5 to an operating unit 12 comprising a forming station 13 suitable for obtaining on the sheet material 2 a plurality of containing cavities 14. The forming station 13 comprises an upper operating part including an upper half mould 15 for interacting with an upper face 16 of the sheet material 2. The forming station 13 further comprises a lower operating part including a lower half mould 17 for interacting with a lower face 18 of the sheet material 2. The upper half mould 15 and the lower half mould 17 are movable in relation to one another between a forming position and a disengaging position. In the forming position, the sheet material 2 is clamped between the upper half mould 15 and the lower half mould 17 that deform the sheet material 2 to obtain thereupon the containing cavities 14. In the disengaging position, the lower half mould 15 and the upper half mould 17 are spaced apart from one another such that the sheet material 2 is free to advance in the advancing direction F. In order to move from the forming position to the disengaging position and vice versa, the upper half mould 15 and/or the lower half mould 17 move in a movement direction Y that is transverse to the advancing direction F. The movement direction Y can be perpendicular to the advancing direction F.

The operating unit 12 may also comprise a preheating station 19, arranged upstream of the forming station 13, to preheat the sheet material 2 to a temperature at which this material softens and can easily be deformed in the forming station 13. The preheating station 19 comprises an upper plate 20, facing the upper face 16 of the sheet material 2, and a lower plate 21, facing the lower face 18.

The lower plate 21 and the upper plate 20 are movable in relation to one another parallel to the movement direction Y, between a work position that is not shown and a rest position shown in FIG. 1. In the work position, the lower plate 21 and the upper plate 20 are in contact with the sheet material 2, or are near the latter, so as to heat the sheet material 2 to the desired temperature. In the rest position, the lower plate 21 and the upper plate 20 are spaced away from the sheet material 2, which can be freely advanced in the advancing direction F.

The preheating station 19 may be absent if the sheet material 2 does not need to be preheated before forming the containing cavities 14, for example if the sheet material 2 is a metal material.

The forming station 13 and the preheating station 19, if present, are enclosed in a housing 22 that insulates the forming station 13 and the preheating station 19 from the external environment. In the housing 22 there is present a sterilising arrangement for sterilising a space adjacent to the upper half mould 15, to the lower half mould 17, to the upper plate 20 and to the lower plate 21, so as to create a substantially aseptic environment above and below the sheet material 2. The sterilising arrangement will be disclosed in detail below.

Downstream of the housing 22 there is a further closed channel 23, extending in the advancing direction F, that connects the operating unit 12 to a further operating unit 24, comprising for example a welding station 25 for welding a closing film 26 to the containing cavities 14 so as to close the containing cavities 14.

Between the forming station 13 and the welding station 25 a filling unit 27 is interposed that can be positioned along the further closed channel 23. The filling unit 27 comprises a reservoir 28 inside which a product 29 is contained that is suitable for filling the containing cavities 14. The product 29 can be a flowing product, for example liquid, pasty or in granules. The reservoir 28 is arranged above the sheet material 2. The filling unit further comprises a dosing device 30, having, for example the shape of cannulas, for introducing into the containing cavities 14 dosed quantities of product 29.

The dosing device 30 leads inside the further closed channel 23, which insulates the sheet material 2 from the external environment, thus preventing the sheet material 2 and the containing cavities 14 obtained thereupon being able to be contaminated during the passage from the forming station 13 to the welding station 25 or during the operations of filling with the product 29.

Downstream of the filling unit 27 the welding station 25 is arranged, comprising an upper operating part including an upper welding element 31 and a lower operating part including a lower contrasting element 32. The upper welding element 31 and the lower contrasting element 32 are movable with respect to one another parallel to the movement direction Y between a welding position and an inactive position. In the welding position, the sheet material 2 and the closing film 26 are clamped between the upper welding element 31 and the lower contrasting element 32, which join the closing film 26 to the sheet material 2 along preset edge zones, for example by means of heat welding or ultrasound welding. In the inactive position, the upper welding element 31 and the lower contrasting element 32 are spaced away from the sheet material 2 and from the closing film 26, so that the sheet material 2 and the closing film 26 can be advanced through the welding station 25.

The welding station 25 is arranged inside a further housing 33 having the function of insulating the welding station 25 from the external environment, in order to prevent contamination of the product 29, or of the containing cavities 14, or yet of the closing film 26. Inside the further housing 33 a sterilising arrangement is provided for sterilising a space adjacent to the upper welding element 31 and to the lower contrasting element 32, so as to create a substantially aseptic environment above and below the sheet material 2 and the closing film 26.

The closing film 26 reaches the welding station 25 after being unwound from a reel that is not shown and being sterilised in a sterilising unit that is not shown, that is similar to the sterilising unit 5 that sterilises the sheet material 2. At the outlet from the sterilising unit, the closing film 26 enters a respective closed channel 34, a part of which is shown in FIG. 1, that prevents the closing film 26 from coming into contact with possible contaminating agents present in the external environment. It is thus prevented that the closing film 26, after being sterilised, is again contaminated before entering the welding station 25. The reel from which the closing film 26 is unwound can be positioned behind the forming line shown in FIG. 1, such that the closing film 26 moves initially along a path that is substantially perpendicular to the advancing direction F. Subsequently, the closing film 26 is deflected by approximately 90° and is superimposed on the sheet material 2.

After the closing film 26 has been welded to the sheet material 2, the closing film 26 hermetically closes the containing cavities 14, so as to define containers 35 joined together by flat portions of closing film 26 superimposed on the sheet material 2. At this point there no longer exist risks of contamination of the product 29 and the containers can be processed in a non-sterile environment. For example, downstream of the welding station 25 there may be a shearing station, of known type, for separating the containers 35 from one another.

Figure 2:
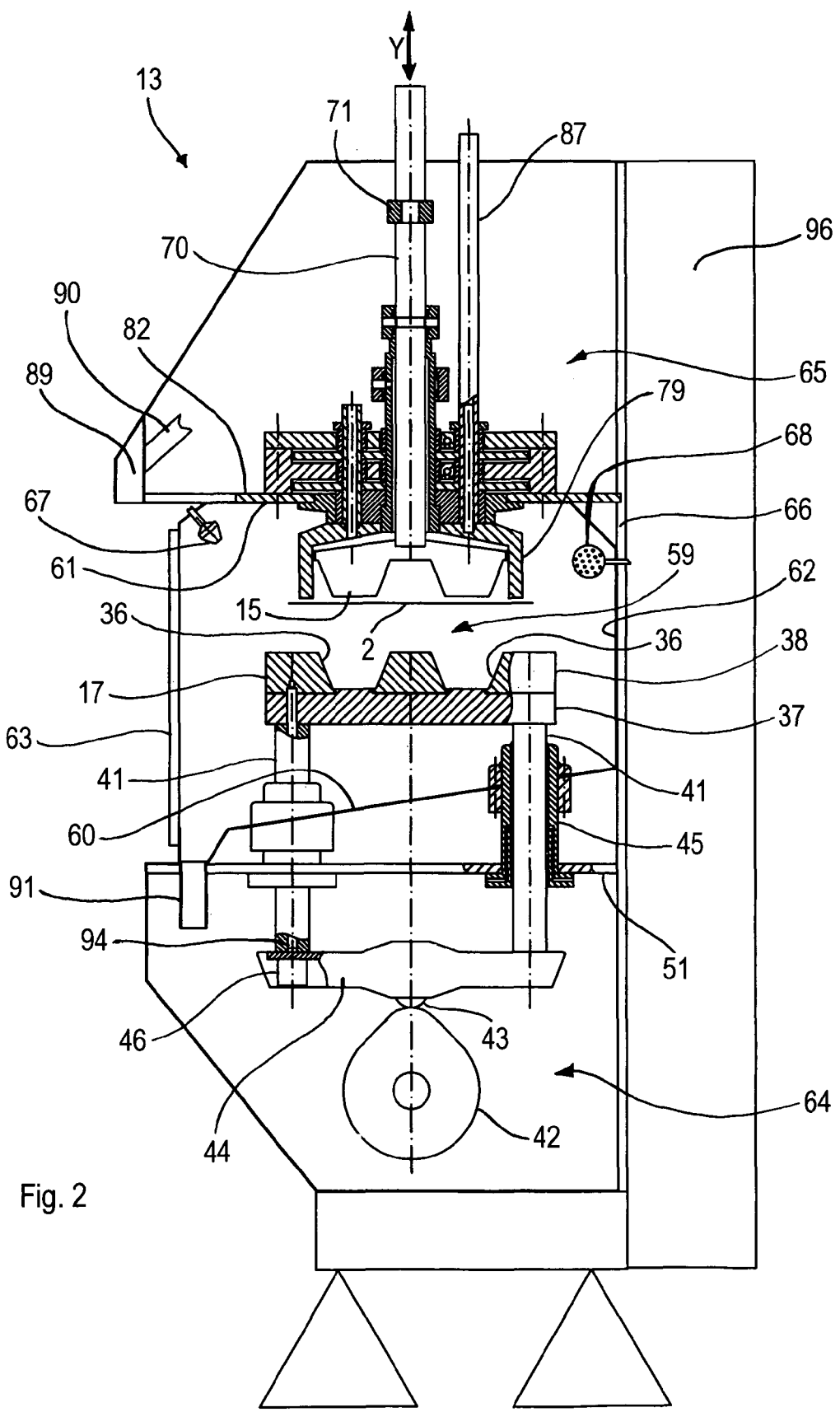
FIG. 2 is a schematic cross section of a forming station included in the apparatus in FIG. 1.

FIG. 2 schematically shows the forming station 13 in section. The upper half mould 15 and the lower half mould 17 are arranged inside a substantially aseptic environment 59 that is insulated from the external environment. The substantially aseptic environment 59 is bounded by a tilted lower wall 60, that is tilted downwards, from an upper wall 61 and from a rear wall 62. The substantially aseptic environment 59 is closed by a door 63, that sealingly engages with the surrounding walls. The door 63 can be made at least partially of glass or another transparent material so as to enable an operator to monitor the substantially aseptic environment 59.

The lower wall 60 separates the substantially aseptic environment 59 from a lower driving zone 64, in which a driving device is positioned for moving the lower half mould 17. The upper wall 61, on the other hand, separates the substantially aseptic environment 59 from an upper driving zone 65 in which a driving device is positioned for moving the upper half mould 15. Lastly, the rear wall 62 is fixed to a supporting plate 66, that is substantially vertical and has the function of supporting both the lower half mould 17 and the corresponding driving device and the upper half mould 15 and the corresponding driving device.

Behind the supporting plate 66 there is arranged a stiffening casing 96, that is used to limit possible deformations of the components of the forming station 13 due to the great forces that are generated during operation.

In an embodiment that is not shown, the stiffening casing 96 may be "C"-shaped, i.e. be provided with two thicker peripheral parts that are respectively adjacent to the lower driving zone 64 and to the upper driving zone 65, which are joined together by a thinner central part.

As previously indicated, in order to ensure that the environment 59 is substantially aseptic during forming of the containing cavities 14 inside the environment a sterilising arrangement is arranged that may comprise a dispensing arrangement for dispensing one or more sterilising fluids. The dispensing arrangement may comprise one or more injectors 67 for injecting a sterilising liquid, for example hydrogen peroxide, inside the environment 59. The injectors 67 are configured in such a way as to divide the sterilising liquid into very small drops that are delivered into the environment 59.

The dispensing arrangement may also comprise one or more sprayers 68, for example of the ball type (so called "spray-ball" type), to introduce into the environment 59 sterilising substances such as washing solutions, hot steam, sterile air.

Although in FIG. 2 there is shown only one sprayer 68 and one injector 67, it is understood that it is possible to use numerous sprayers 68 and injectors 67, arranged in different positions above and below the sheet material 2, so as to distribute the sterilising fluids in a uniform manner in the entire environment 59.

The lower half mould 17 has at least a recess 36 for forming a containing cavity 14. In the example shown, the lower half mould 17 has two recesses 36. The lower half mould 17 is made of two parts, i.e. it is formed of two distinct components, and comprises a base 37 and an upper body 38, shown in detail in FIG. 3. On an upper surface of the base 37 a bottom surface 39 of each recess 36 is obtained, whilst through the thickness of the upper body 38 a side surface 40 of each recess 36 is obtained.

The lower half mould 17 is supported by a pair of shafts 41 on which the driving device acts that moves the lower half mould 17 in the movement direction Y between the forming position and the disengaging position. In the example shown, the movement direction Y is vertical. The driving device comprises a cam 42 that engages a wheel 43 fixed to a crosspiece 44. Respective lower portions of the shafts 41 are fixed to opposite ends of the crosspiece 44. When, owing to the rotation of the cam 42, the crosspiece 44 is moved in the movement direction Y, also the shafts 41 move simultaneously along the movement direction Y, sliding inside respective guiding sleeves 45.

Figure 3:
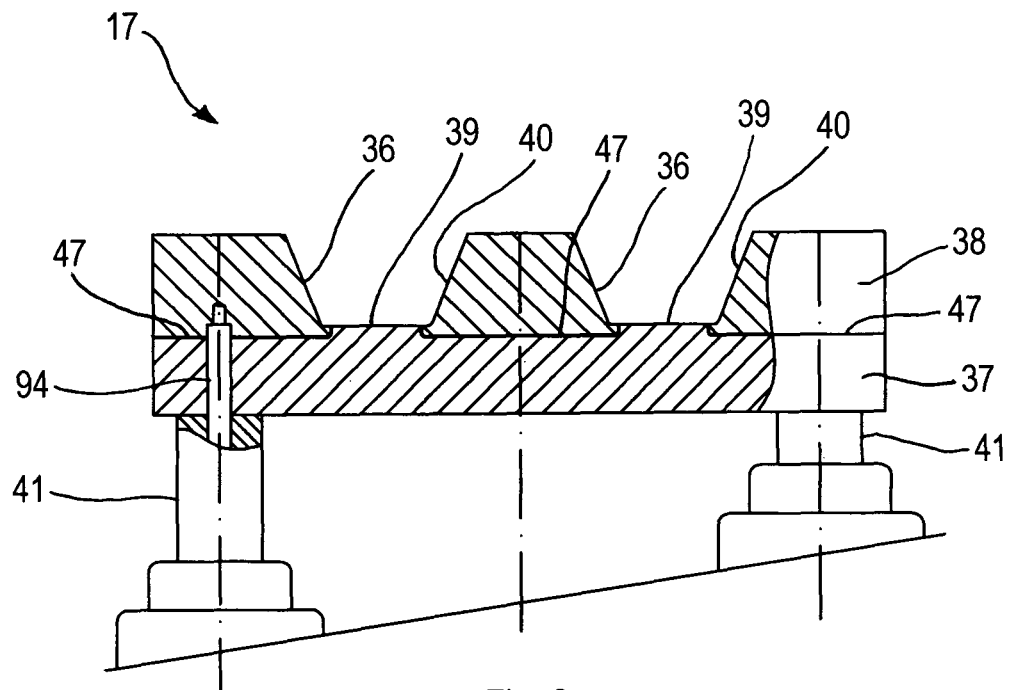
FIG. 3 is a partially sectioned schematic view of a lower half mould of the forming station in FIG. 2, in a first operating position.

As visible in the left side of FIG. 2, inside each shaft 41 a stem 94 is slidably movable, which is also visible in FIG. 3, having a first end fixed to the upper body 38. The stem 94 passes through the base 37 and may slide in relation to the latter. A second end of the stem 94, opposite the first end, is connected to an actuating device for moving the stem 94 in the movement direction Y. In the example shown, the actuating device comprises a pneumatic cylinder 46 fixed to the crosspiece 44.

Figure 4:
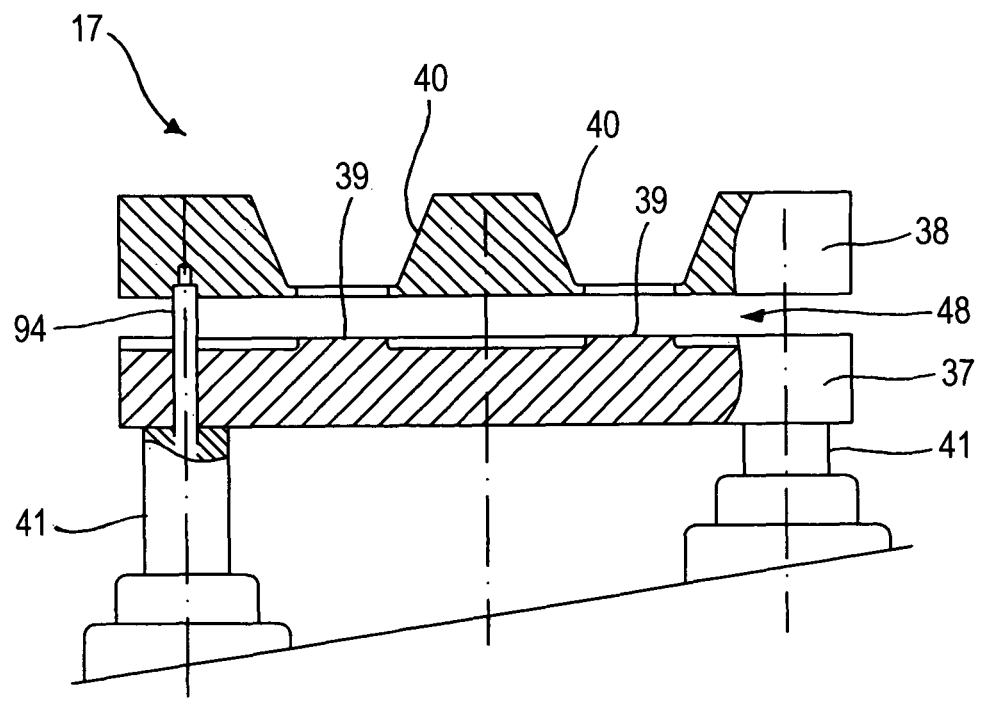
FIG. 4 is a view like that in FIG. 3, showing the lower half mould in a second operating position.

The pneumatic cylinder 46 enables the stem 94 to be moved between a retracted position shown in FIG. 3 and an extended position shown in FIG. 4. In the retracted position, the upper body 38 is substantially in contact with the base 37 so as to define the recesses 36. In this position, between the base 37 and the upper body 38 there is defined a thin gap 47 that acts as a vent for air during forming of the sheet material 2. The dimensions of the gap 47 are so small that the gap 47 does not cause deformation on the sheet material 2 during forming.

In the extended position, the upper body 38 is spaced away from the base 37 so as to define a passage 48 for a sterilising liquid, arranged for sterilising the forming station 13, as will be disclosed better below.

Figure 5:
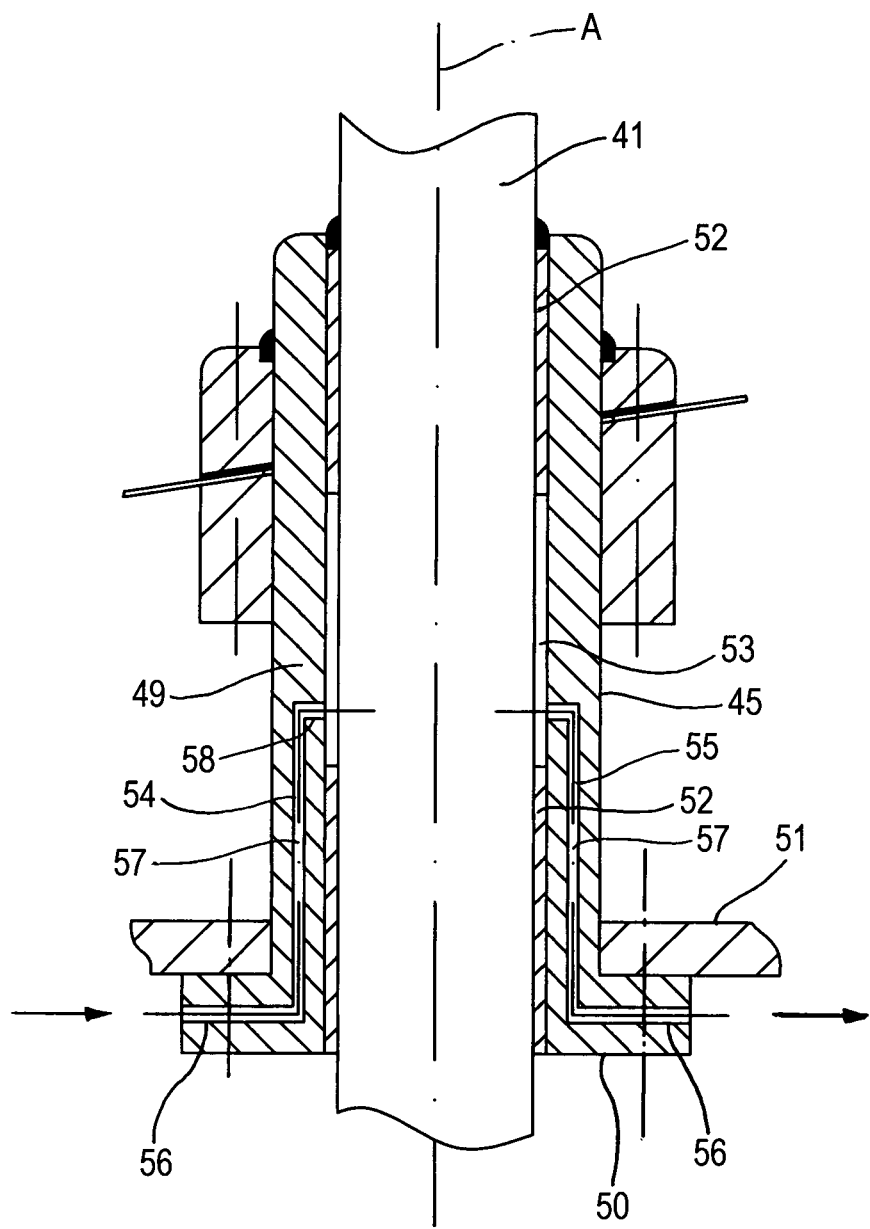
FIG. 5 is a schematic cross section showing a guiding sleeve included in the forming station in FIG. 2.

Each guiding sleeve 45 has the structure shown in FIG. 5 and comprises a flange 50 from which a tubular portion 49 projects that extends around a longitudinal axis A of the corresponding shaft 41. The flange 50, which extends transversely to the longitudinal axis A, is connected to a plate 51 arranged in a fixed position in the forming station 13.

Between the tubular portion 49 and the shaft 41 two bushes 52 are interposed, which are, for example, made of plastics with a low friction coefficient. The bushes 52 are spaced apart from one another along the longitudinal axis A, such as to define an annular chamber 53. The annular chamber 53 is bounded, in addition to the bushes 52, by an internal surface of the tubular portion 49 and by an external surface of the shaft 41.

The sleeve 45 has an inlet conduit 54, that leads into the annular chamber 53, to lead into the annular chamber 53 a contamination-inhibiting fluid. The sleeve 45 moreover has an outlet conduit 55 that enables the contamination-inhibiting fluid to be evacuated from the annular chamber 53. Both the inlet conduit 54 and the outlet conduit 55 have a first portion 56 that extends in the flange 50, an intermediate portion 57 that extends in the tubular portion 49 parallel to the longitudinal axis A, and a second portion 58 that extends in the tubular portion 49 transversely to the longitudinal axis A, such as to connect the intermediate portion 57 to the annular chamber 53.

The contamination-inhibiting fluid delivered into the annular chamber 53 through the inlet conduit 54 and evacuated through the outlet conduit 55 can be compressed air, which creates overpressure in the annular chamber 53. Owing to this overpressure, it is possible to prevent possible contaminating substances in the lower driving zone 64, for example oil and grease coming from the cam 42, reaching the substantially aseptic environment 59 by penetrating through the guiding sleeve 45 and the shaft 41. Alternatively, the contamination-inhibiting fluid can be pressurised hot steam, that, in addition to creating overpressure inside the annular chamber 53, also exerts a sterilising action owing to the high temperature thereof.

Figure 6:
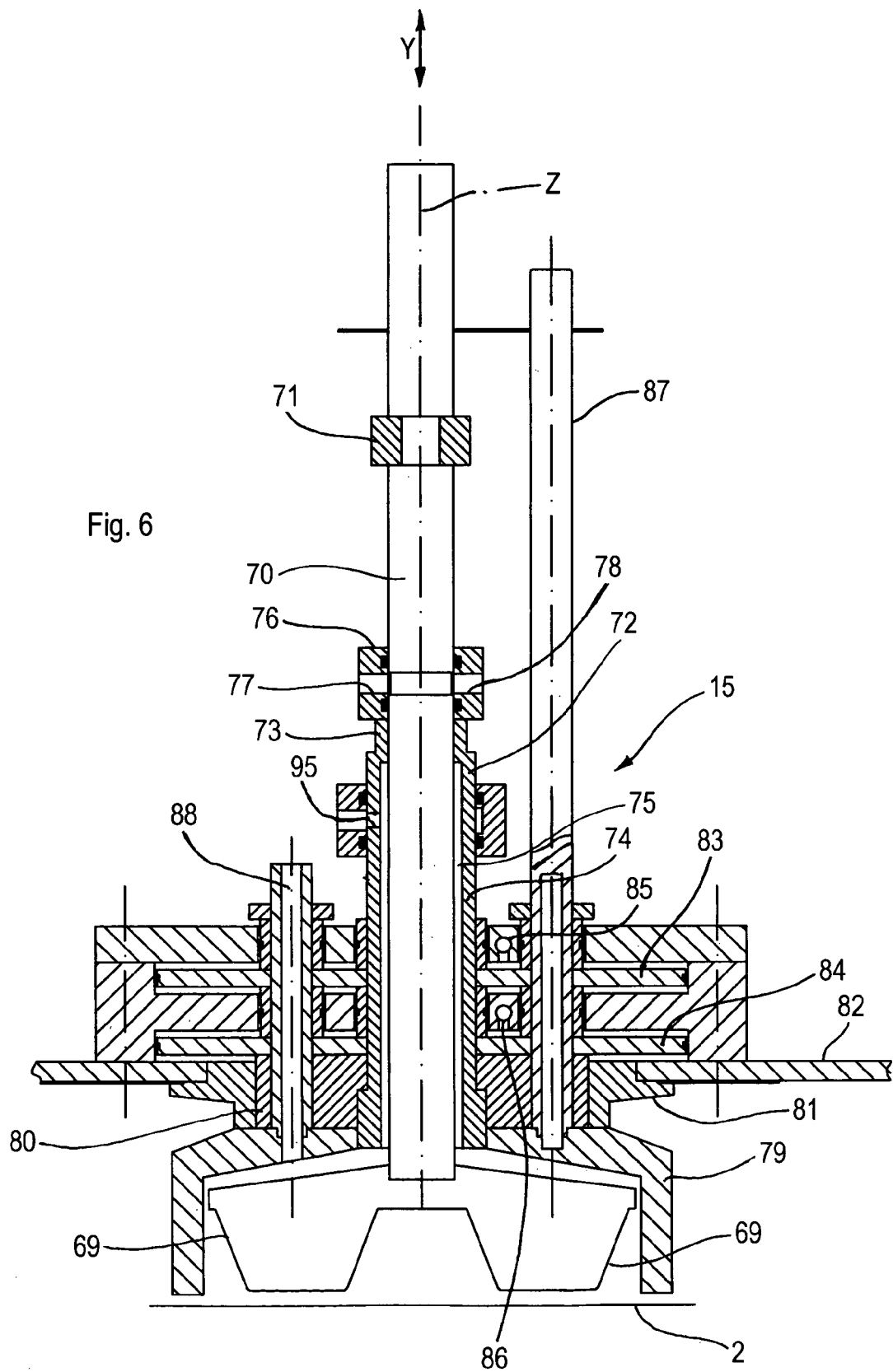
FIG. 6 is a schematic cross section showing an upper half mould of the forming station in FIG. 2.

As shown in FIG. 6, the upper half mould 15 comprises at least a punch 69 for internally shaping the containing cavities 14. In the example shown, there are provided two punches 69, each of which is received in a corresponding recess 36.

The punches 69 are connected to a control shaft 70, which is movable in the movement direction Y owing to a respective driving device. The driving device may comprise a lever 71 that extends perpendicularly to the plane of the sheet and is oscillated by an actuator that is not shown.

The control shaft 70 is slidable along the movement direction Y inside a sleeve 72. The sleeve 72 has an upper portion 73, having an internal diameter that is substantially equal to the external diameter of the control shaft 70. Further, the sleeve 72 has a lower portion 74, having an internal diameter that is greater than the external diameter of the control shaft 70, such as to define, between the lower portion 74 and the control shaft 70, a tubular chamber 75. An inlet hole 95 leads into the tubular chamber 75, which inlet hole 95 is made through the thickness of the sleeve 72. The inlet hole 95 can be connected to a pipe of a circuit that is not shown to introduce a washing liquid into the tubular chamber 75.

In an embodiment, above the sleeve 72 there can be a distributing element for distributing a contamination-inhibiting fluid. The distributing element may comprise a distributing ring 76 having an inlet hole 77 for introducing between an internal surface of the distributing ring 76 and the control shaft 70 the contamination-inhibiting fluid. An outlet hole 78 enables this fluid to be evacuated. The contamination-inhibiting fluid creates overpressure between the control shaft 70 and the distributing ring 76, in order to prevent the contaminating substances present in the upper driving zone 65 from reaching the substantially aseptic environment 59 through the tubular chamber 75. The contamination-inhibiting fluid may be pressurised hot steam that, in addition to generating the overpressure, has a sterilising effect owing to the high temperature thereof.

The upper half mould 15 further comprises a bell body 79, arranged for enclosing the punches 69 above and laterally. The bell body 79 is fixed to a supporting disc 80, that is slidable with respect to a flanged ring 81 screwed to a further plate 82 of the forming station 13.

On the supporting disc 80 an actuating device acts comprising a first piston 83 and a second piston 84, arranged in sequence along an axis Z of the control shaft 70. The first piston 83 and the second piston 84 are movable inside respective cylinders owing to a first operating fluid, supplied through a first hole 85, and owing to a second operating fluid, supplied through a second hole 86. A column 87 helps to support the bell body 79.

The forming station 13 further comprises a conduit 88, which leads inside the bell body 79, to introduce into the bell body 79 a forming fluid, for example compressed air, which facilitates deformation of the sheet material 2. The conduit 88 is obtained in a pipe that passes through the first piston 83, the second piston 84 and the supporting disc 80.

The forming station 13 further comprises a sucking device, including a suction hood 89 shown in FIG. 2, positioned near an upper region of the door 63. The suction hood 89 is connected to a sucking pipe 90 for sucking possible vapour exiting the door 63.

In the lower wall 60 an evacuating conduit 91 is obtained, which is closable by means of a valve that is not illustrated to evacuate washing or sterilising liquids from the substantially aseptic environment 59.

Figure 10:
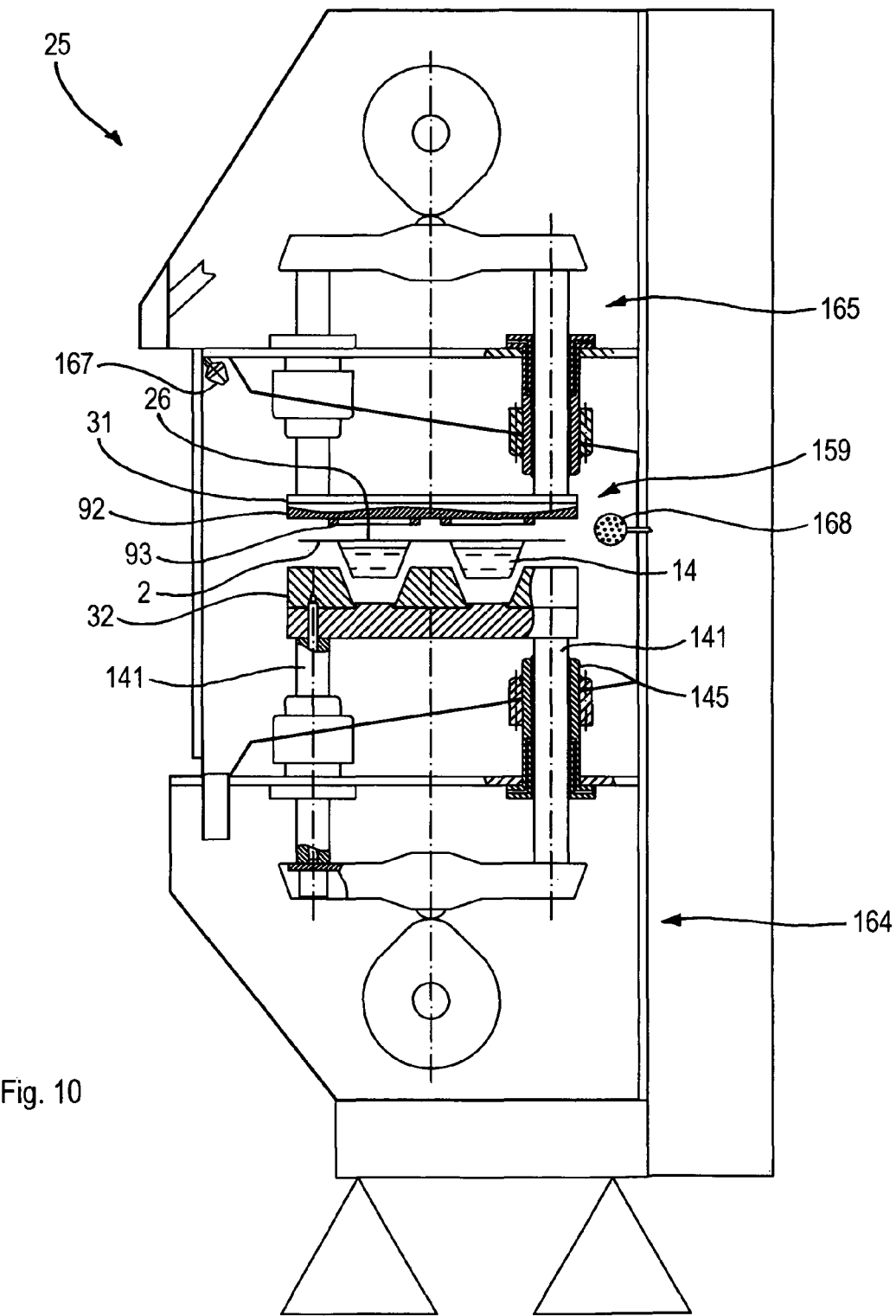
FIG. 10 is a schematic cross section of a welding station included in the apparatus in FIG. 1.

FIG. 10 shows schematically the welding station 25, which comprises a lower driving zone 164 similar to the lower driving zone 64 of the forming station 13.

The lower contrasting element 32 of the welding station 25 is made of two parts, as shown in FIGS. 3 and 4 with reference to the lower half mould 17 of the forming station 13. The contrasting element 32 is driven parallel to the movement direction Y by two shafts 141 that slide inside respective guiding sleeves 145 that are similar to the guiding sleeve 45 shown in FIG. 5.

The upper welding element 31 comprises a plate element 92 from which there protrude ridges 93 that are intended for coming into contact with the closing film 26. The latter, together with the sheet material 2, is pressed between the ridges 93 and the lower contrasting element 32 such as to seal the closing film 26 to the sheet material 2 along edge zones surrounding the containing cavities 14. The ridges 93 have an annular plan shape corresponding to the shape of the edge zones.

As the welding station 25 does not comprise the bell body 79, driving the upper welding element 31 is simplified compared with driving the upper half mould 17 of the forming station 13. In particular, for the upper welding element 31 a driving device, arranged in an upper driving zone 165, similar to that of the lower contrasting element 32, can be used.

In an embodiment, the upper welding element 31 can be driven by one or more shafts that are similar to the control shaft 70 of the forming station 13, i.e. are slidable inside a sleeve in which a washing liquid can be sent.

The upper welding element 31 and the lower contrasting element 32 are arranged inside a substantially aseptic environment 159, similar to the substantially aseptic environment 59 of the forming station 13. In the substantially aseptic environment 159 there is provided a sterilising arrangement that may comprise one or more injectors 167 and one or more sprayers 168, similarly to what is provided for the welding station.

Also the closed channel 11, the further closed channel 23 and the respective closed channel 34 may comprise a sterilising arrangement, including, for example, the injectors 67 and the sprayers 68.

During operation, a step of washing the operating units 12 and 24 and the closed channels 11, 23 and 34 is preliminarily conducted. During this step, in the apparatus 1 there is neither the sheet material 2, nor the closing film 26.

The washing step is performed with a washing liquid that may comprise an acid and soda solution or any other washing solution. The washing liquid is dispensed by the sprayers 68 and 168 that send the washing solution to the environments 59 and 159, in addition to the closed channels 11, 23 and 34.

The washing liquid is further introduced into the environment 59 and possibly into the environment 159 through the inlet hole 95 and the tubular chamber 75, such as to wash the upper half mould 15 and possibly the upper welding element 31.

Lastly, the washing liquid is sent to the environment 59 through the inlet conduit 56 and the annular chamber 53, so as to wash the shafts 41. This may occur both in the forming station 13 and in the preheating station 19 and in the welding station 25.

In this step, the stems 94 of the forming station 13 and the corresponding stems of the welding station 25 are in the extended position shown in FIG. 4, such that the washing liquid, after washing the recesses 36, can exit the lower half mould 17 or can exit the lower contrasting element 32 through the passage 48.

The excess washing liquid flows along the lower wall 60 owing to the tilt thereof and is evacuated from the environment 59 through the evacuating conduit 91, which in this step is open.

A similar situation occurs in the welding station 25. After the washing step, a drying step is conducted by dispensing hot steam through the sprayers 68 and 168. The hot steam enables the residues of washing liquid to be dried.

At this point the sheet material 2 and the closing film 26 are introduced inside the apparatus 1, such that the sheet material 2 defines a substantially horizontal plane whilst it advances inside the operating unit 12 and the further operating unit 24. The door 63 of the operating unit 12, as also the similar door of the welding station 25, are shut.

Through the injectors 67 and 167 a sterilising liquid is dispensed, for example hydrogen peroxide, in order to eliminate germs and bacteria. The sterilising liquid is introduced into the operating unit 12 to sterilise the preheating station 19 and the forming station 13, and into the further operating unit 24 to sterilise the welding station 25. The sterilising liquid is further sent to the closed channels 11, 23 and 34.

It should be noted that both the injectors 67 and 167 and the sprayers 68 and 168 send the respective fluids both above and below the sheet material 2, so as to make the environment 59 and 159 sterile that surrounds the sheet material 2 on all sides.

After introducing the sterilising liquid, the sprayers 68 and 168 send vapour, which is possibly hot, which dries the sterilising liquid and forms hydrogen peroxide vapour that sterilises the sheet material 2, the closing film 26 and the surrounding environment.

The apparatus 1 is now in an aseptic condition and is ready for producing containers.

During production, sterile air is constantly sent through the sprayers 68 of the operating unit 12, the sprayers 168 of the further operating unit 24 and the sprayers that are not shown of the closed channels 11, 23 and 34 so as to maintain the apparatus 1 in an aseptic condition.

The sheet material 2, unwound from the reel 4, is advanced in an indexed manner in the advancing direction F and taken to the sterilising unit 5, from which it exits in a substantially sterile condition. Subsequently, through the closed channel 11, the sheet material 2 reaches the preheating station 19 in which it is preheated to a desired softening temperature. The advancing device then advances the sheet material 2 to the forming station 13, in which the lower half mould 17 and the upper half mould 15 are initially in the disengaging position shown in FIG. 1. Whilst the sheet material 2 is stationary in the forming station 13, the cam 42 moves the lower half mould 17 upwards until the latter comes to abut against the lower face 18 of the sheet material 2, as shown in FIG. 7. Both the punches 69 and the bell body 79 are spaced away from the upper face 16 of the sheet material 2.

At this point the first piston 83 and the second piston 84 push the bell body 79 downwards, such that a lower end thereof comes to abut against the upper face 16 of the sheet material 2, as shown in FIG. 8. As the lower end of the bell body 79 protrudes slightly in relation to the punches 69, the latter are not yet in contact with the upper face 16 of the sheet material 2.

In the configuration in FIG. 8, the bell body 79, which presses the sheet material 2 against the lower half mould 17, sealingly closes the space around the sheet material 2.

A forming fluid, for example compressed air, can be sent through the conduit 88 to the sheet material 2. The forming fluid deforms the sheet material 2 and pushes the forming fluid to the walls of the recesses 36, thus facilitating the forming thereof.

Subsequently, the control shaft 70 moves the punches 69 downwards, which penetrate inside the recesses 36 and deform the sheet material 2, thus giving rise to the containing cavities 14. In this manner the forming position shown in FIG. 9 is reached.

At the end of the forming step, the lower half mould 17 and the upper half mould 15 move away from one another and the sheet material 2, on which the containing cavities 14 were obtained, is advanced through the further closed channel 23. The containing cavities 14 are here filled with the product 29, owing to the dosing device 30 of the filling unit 27.

Subsequently, the sheet material 2, having the containing cavities 14 filled with the product 29, is advanced to the welding station 25 in which it is joined to the previously sterilized closing film 26.

At this point, the product 29 is sealed in aseptic containers 35 that can be subsequently processed, for example to separate the aseptic containers 35 from a sheet material 2, in a non-sterile environment.

The apparatus 1 enables aseptic containers to be obtained in a simple manner. In particular, owing to the substantially aseptic environment that surrounds the sheet material 2 and the closing film 26 on both faces, the sheet material 2 and the closing film 26 can be moved by using traditional advancing devices, for example of the gripper type. The complicated prior-art advancing devices are not therefore necessary.

Further, by adopting single operating units, it is possible to confer to the apparatus 1 a very flexible modular structure. For example, between the operating unit 12 and the further operating unit 24 it is possible to insert more than one filling unit, or devices of another type intended for performing particular functions. Further, the various operating units that make up the apparatus 1 can be arranged according to any desired layout.

Lastly, the apparatus 1 can easily be adapted to producing containers 35 of various shapes and dimensions by simply replacing the components of the lower half mould 17 and of the upper half mould 15 in which the recesses 36 and the punches 69 are obtained.

The invention claimed is:

1. Apparatus for obtaining containers from a sheet material, comprising an operating unit for processing said sheet material, said operating unit comprising an upper operating part for interacting with an upper surface of said sheet material and a lower operating part for interacting with a lower surface of said sheet material, wherein said apparatus comprises a sterilizing arrangement for sterilizing a space adjacent to said upper operating part and to said lower operating part, so as to create a substantially aseptic environment above and below said sheet material, wherein said lower operating part is provided with at least a recess for housing a containing cavity of a container, said recess being defined by two distinct components of said lower operating part comprising a base body defining a lower surface of said at least a recess and an upper body defining a side surface of said at least a recess, and further comprising a movement device for moving said two components away from one another, such as to define between said two components a passage for evacuating a liquid introduced into said recess by said sterilizing arrangement.

2. Apparatus according to claim 1, wherein said sterilising arrangement comprises a dispensing arrangement for dispensing a fluid that eliminates possible contamination present in said environment.

3. Apparatus according to claim 2, wherein said dispensing arrangement comprises a spraying device for spraying a sterilizing liquid into said environment.

4. Apparatus according to claim 2, wherein said dispensing arrangement comprises an injecting device for injecting into said environment a fluid selected from a washing solution, sterile air, and vapour.

5. Apparatus according to claim 2, wherein said dispensing arrangement is positioned above and below said sheet material.

6. Apparatus according to claim 1, wherein said environment is interposed between an upper driving zone arranged for driving said upper operating part and a lower driving zone arranged for driving said lower operating part.

7. Apparatus according to claim 6, wherein a side of said environment is bounded by a supporting structure from which said lower driving zone and said upper driving zone project.

8. Apparatus according to claim 1, wherein said environment is closed frontally by a door, and further comprising a suction device near said door for evacuating possible vapour exiting said environment.

9. Apparatus according to claim 1, wherein said environment is bounded by a tilted lower wall.

10. Apparatus according to claim 9, wherein in said lower wall there is obtained an evacuation hole that is opened and closed selectively for evacuating a liquid dispensed into said environment by said sterilizing arrangement.

11. Apparatus according to claim 1, and further comprising a shaft member for moving said lower operating part and/or said upper operating part, said shaft member being slidable inside a tubular element.

12. Apparatus according to claim 11, wherein between said shaft member and said tubular element there is defined an annular chamber supplied with a contamination-inhibiting fluid to prevent contaminating of said lower operating part and/or said upper operating part with contaminating substances that penetrate between said shaft member and said tubular element.

13. Apparatus according to claim 12, wherein said contamination-inhibiting fluid is selected from pressurized sterile air and hot steam.

14. Apparatus according to claim 1, wherein said upper operating part is supported by a shaft that is slidable inside a sleeve, between said shaft and said sleeve there being defined a tubular chamber connected to a circuit for supplying to said tubular chamber a washing solution directed to said upper operating part.

15. Apparatus according to claim 1, wherein said operating unit comprises a forming station for obtaining containing cavities on said sheet material.

16. Apparatus according to claim 15, wherein said upper operating part comprises at least a punch for deforming said sheet material so as to obtain said containing cavities.

17. Apparatus according to claim 16, wherein said upper operating part comprises a bell body inside which said punch is movable.

18. Apparatus according to claim 17, and further comprising an actuating device for pushing said bell body to said lower operating part, such as to clamp said sheet material between said bell body and said lower operating part.

19. Apparatus according to claim 18, wherein said actuating device is positioned above said sheet material.

20. Apparatus according to claim 18, wherein said actuating device comprises a first actuating cylinder and a second actuating cylinder arranged in sequence along a movement direction of said bell body.

21. Apparatus according to claim 17, and further comprising a supplying device for supplying between said bell body and said sheet material a forming fluid that deforms said sheet material.

22. Apparatus according to claim 15, wherein said forming station is arranged inside a housing.

23. Apparatus according to claim 15, and comprising a sterilizing unit arranged upstream of said forming station for sterilizing said sheet material.

24. Apparatus according to claim 23, wherein said forming station is arranged inside a housing and wherein said sterilizing unit is connected to said housing via a closed channel defining a sterile path for said sheet material.

25. Apparatus according to claim 1, wherein said operating unit comprises a preheating station for preheating said sheet material.

26. Apparatus according to claim 25, wherein said forming station is arranged inside a housing and wherein said preheating station is arranged inside the same housing wherein said forming station is arranged.

27. Apparatus according to claim 1, wherein said operating unit comprises a welding station for welding a closing film to said sheet material, in order to close said containers.

28. Apparatus according to claim 27, wherein said upper operating part comprises a welding element having at least one ridge for contacting a selected zone of said closing film, so as to join said closing film to said sheet material at said selected zone.

29. Apparatus according to claim 28, wherein said lower operating part comprises a contrasting element for supportingly receiving said sheet material and said closing film pressed by said welding element.

30. Apparatus according to claim 27, wherein said forming station is arranged inside a housing and wherein said welding station is arranged inside a further housing, said further housing being connected to said housing by a further closed channel defining a sterile path for said sheet material.

31. Apparatus according to claim 30, and comprising a filling unit having a dosing device leading into said further closed channel for dispensing a product into said containers.

32. Apparatus according to claim 30, and further comprising a sterilizing device for sterilizing said closing film, said sterilizing device being connected to said further housing by a respective closed channel defining a sterile path for said closing film.

33. Apparatus according to claim 1, and further comprising an advancing device for advancing said sheet material in an advancing direction, such that said sheet material defines a substantially horizontal plane.

34. Apparatus according to claim 33, wherein said advancing device comprises a pair of grippers suitable for engaging opposite edge portions of said sheet material, the grippers of said pair having a length, in said advancing direction, that is less than the length of said operating unit.

* * * * *